No. 726,524. PATENTED APR. 28, 1903.
A. M. FURROW.
CORN CARVER.
APPLICATION FILED DEC. 6, 1902.
NO MODEL.
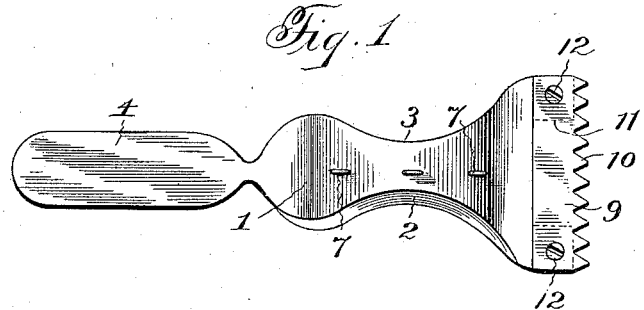
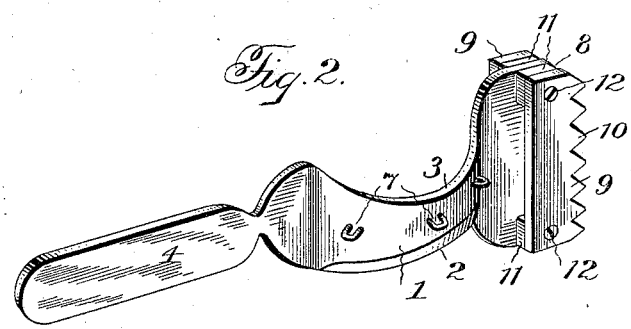
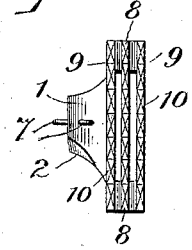
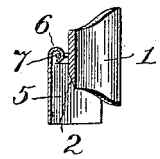
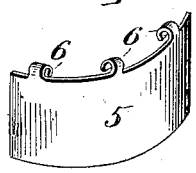
Witnesses:
Jas. E. Hutchinson.
H. A. Farnham.
Inventor.
A. M. Furrow
By Swift & Co.
attys.

UNITED STATES PATENT OFFICE.

ANNIE M. FURROW, OF WASHINGTON, DISTRICT OF COLUMBIA.

CORN-CARVER.

SPECIFICATION forming part of Letters Patent No. 726,524, dated April 28, 1903.

Application filed December 6, 1902. Serial No. 134,137. (No model.)

*To all whom it may concern:*

Be it known that I, ANNIE M. FURROW, a citizen of the United States, residing at Washington, District of Columbia, have invented a new and useful Green-Corn Carver; and I do hereby declare the following to be a full, clear, and exact description of the invention, such as will enable others skilled in the art to which it appertains to make and use the same.
The invention relates to a corn-carver; and it has for its object to provide a simple, inexpensive, and efficient device designed for removing the kernels from the green corn and adapted to first cut the corn from the cob and then remove the ends of the kernels which are usually left on the cob, thereby completely separating the corn from the cob.

A further object of the invention is to provide a corn-carver of this character having a guard or shield to prevent the corn from scattering as it is severed from the cob and adapted to be readily detached to permit the knife to be used for other purposes.

The invention consists in the novel construction and arrangement of parts hereinafter described and shown, and particularly pointed out in the claims hereto appended.

In the drawings forming part of this specification, and in which like numerals of reference designate corresponding parts, Figure 1 is an elevation of a corn-carver constructed in accordance with this invention. Fig. 2 is a perspective view of the same, the guard being removed. Fig. 3 is an end view of the corn-carver. Fig. 4 is a transverse sectional view illustrating the manner of securing the guard to the blade. Fig. 5 is a detail view of the guard.

Referring to the drawings, 1 designates a curved or bowed blade constructed of steel and having a curved cutting edge 2, the opposite edge 3 being also preferably curved to present an attractive appearance. The blade, which is oppositely tapered, is provided at one end with a suitable handle 4, and it is adapted to extend partially around the ear of corn to enable a large amount of the same to be sliced off at a single cut. The cutting edge, which is beveled, is sigmoidally curved to enable the blade when pressed downward to cut readily through the corn, so that the same may be quickly severed from the cob; but any other desired form of cutting edge may be provided. The cutting edge is concavely curved in order to make a shear cut when the knife is moved downward from one end of a cob to the other, and in order to prevent the corn from scattering a bowed guard 5 is employed. The guard extends outward beyond the cutting edge of the device, and it is provided at its inner edge with a series of tongues 6, which are detachably arranged in loops or eyes 7 of the blade, whereby the guard may be readily detached to permit the knife to be used for any other purpose. Instead of securing the guard to the blade by means of the loops and tongues the latter may be fastened by any other suitable means, and any other fastening device may be provided for detachably mounting the guard on the blade. The blade is provided at its outer enlarged end with a transverse series of triangular teeth, and a pair of transverse plates 9, having similar teeth 10, coöperates with the teeth 8 of the blade. The triangular teeth 10 of the plates are arranged opposite the teeth of the blade, and the said teeth are spaced from the blade by blocks 11, suitable fastening devices 12 being employed for securing the parts together. The triangular teeth are adapted to enable the ends of the kernels remaining on the cob after the corn is cut off to be readily scraped from the cob, so that the latter is perfectly clean. By this construction all of the grains or kernels are removed from the cob by the operation of cutting and scraping, and considerable more corn is thus obtained than is possible by a simple cutting operation.

It will be seen that the corn-carver is exceedingly simple and inexpensive in construction, that it is easily handled, and that it will enable all of the corn of a cob to be removed therefrom.

It will be understood that various changes in the form, proportion, and minor details of construction within the scope of the appended claims may be made without departing from the spirit or sacrificing any of the advantages of the invention.

What I claim is—

1. A green-corn carver comprising a handle, and a laterally-bowed blade having at its outer end a transverse plate having its edge formed into a series of teeth, said blade being provided at one side with a longitudinal concave cutting edge, substantially as described.

2. A green-corn carver comprising a handle, a blade provided at its outer end with a transverse plate having its edge formed into a series of teeth, and having a longitudinal cutting edge at one side, and a guard conforming to and extending beyond the cutting edge, substantially as described.

3. A green-corn carver comprising a handle, a blade provided at one end with a transverse plate having its edge formed into a series of teeth, and having a longitudinal cutting edge at one side, eyes mounted in the blade, and a detachable guard provided at one edge with hooks engaging the eyes, substantially as described.

In testimony whereof I have hereto affixed my signature in the presence of two witnesses.

ANNIE M. FURROW.

Witnesses:
DEAN SWIFT,
HERBERT C. EMERY.